United States Patent [19]

Häberle

[11] Patent Number: 5,439,205
[45] Date of Patent: Aug. 8, 1995

[54] VACUUM-TYPE WORK PIECE CLAMPING DEVICE

[75] Inventor: Rainer Häberle, Laichingen, Germany

[73] Assignee: Firma Gerhard Häberle, Laichingen, Germany

[21] Appl. No.: 199,376

[22] Filed: Feb. 18, 1994

[30] Foreign Application Priority Data

Feb. 20, 1993 [DE] Germany .............. 43 05 260.6

[51] Int. Cl.⁶ ............................................ B25B 11/00
[52] U.S. Cl. .............................................. 269/21
[58] Field of Search ................. 269/20, 21, 900; 51/235; 279/3; 248/362, 363

[56] References Cited

U.S. PATENT DOCUMENTS 3,652,075  3/1972  Thompson ............... 269/21
4,174,828  11/1979 Bergman ................ 269/20
4,901,990  2/1990  Frechette .............. 269/20

FOREIGN PATENT DOCUMENTS 3733708  9/1988  Germany .

*Primary Examiner*—Robert C. Watson
*Attorney, Agent, or Firm*—Anderson Kill Olick & Oshinsky

[57] ABSTRACT

The invention relates to a work piece clamping device with a base plate for vacuum-type clamping of work pieces. The base plate 6 comprises a system of grooves 9 at its surface 8, a seal 57 is placed into selectable grooves 10 of the system of grooves 9 and channels 52, which can be opened discharge into the grooves 10, lead to at least one vacuum source junction 56 on the base plate 6.

5 Claims, 2 Drawing Sheets

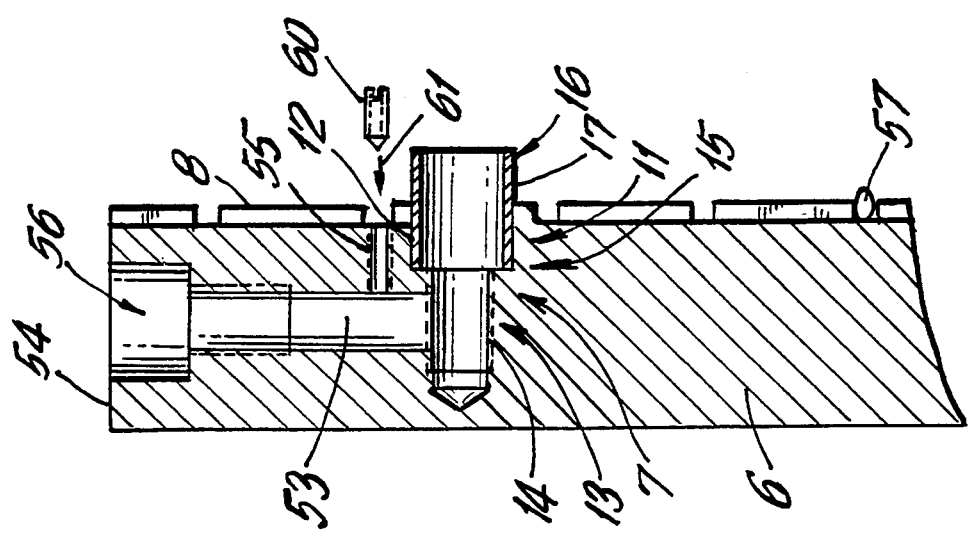
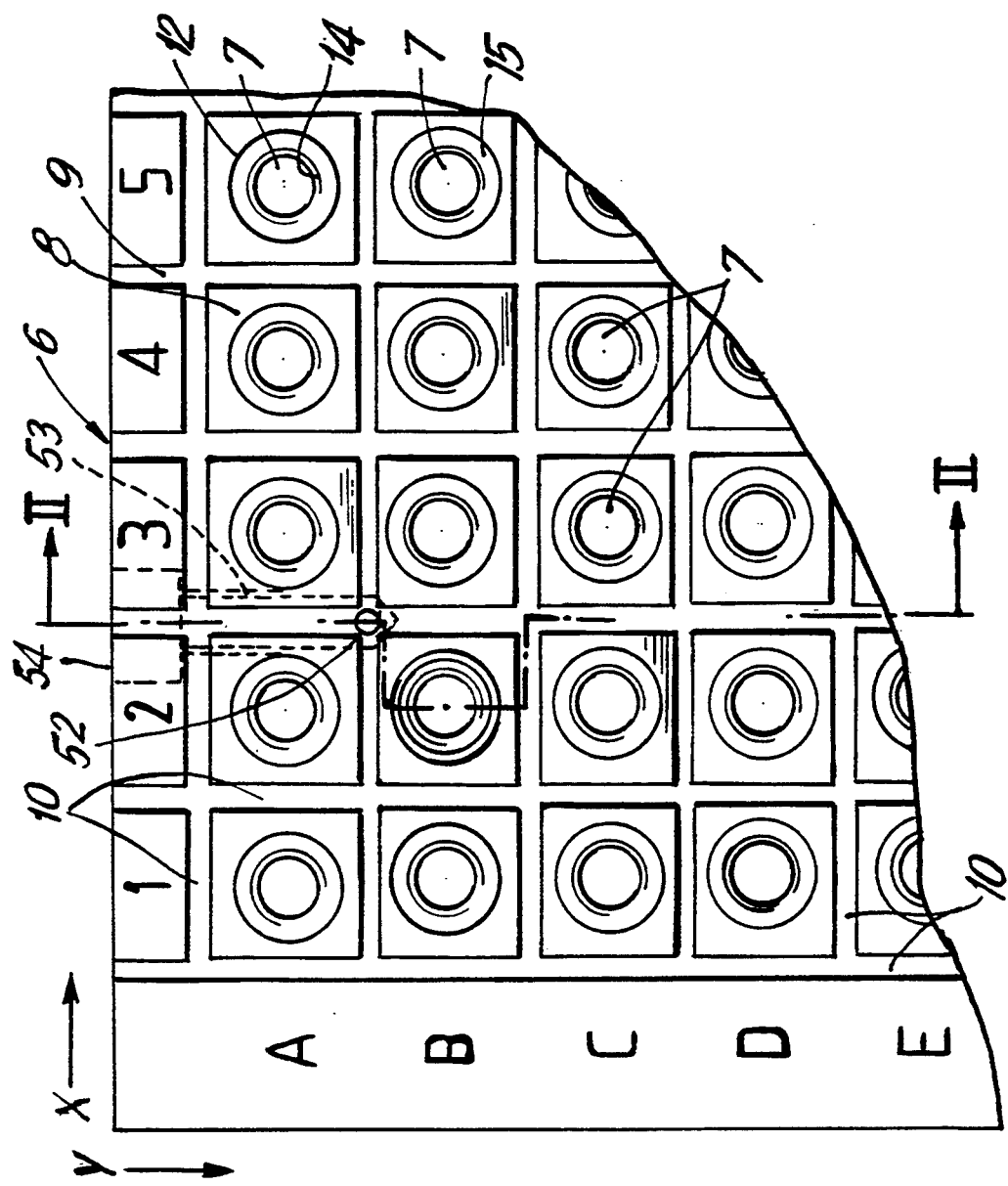

VACUUM-TYPE WORK PIECE CLAMPING DEVICE

FIELD OF THE INVENTION

The present invention relates to a work piece clamping device comprising a base plate for clamping work pieces by vacuum.

BACKGROUND OF THE INVENTION

Fixing or attaching objects by means of negative pressure is, of course, known. For instance, paper sheet processing machines either stop or hold sheets to be conveyed by means of vacuum.

SUMMARY OF THE INVENTION

The present invention relates to a work piece clamping device, comprising a base plate on which one of several work pieces can be fixed by the use of very simple means which do not interfere with the processes of the same.

The objectives of the invention are solved by vacuum-type work piece clamping device having a base plate with a system of grooves on its surface, a seal placed into selectable grooves of the groove system, and channels or ducts which lead to at least one vacuum source junction in the base plate and which, can be opened and discharge into the grooves. This layout permits clamping of a work piece on the surface of the base plate using vacuum. For this purpose, specific grooves of the system are selected in such a way that their contour is smaller than the contour of the work piece, and the system of grooves permits a large variety of different contours. The grooves are selected in such a way that they constitute a contour closed in itself. After this has occurred, a seal, preferably strip-shaped and cut to the required dimension, is placed into the selected groove in the form of a contour closed in itself. The depth of the grooves, compared to the cross-sectional dimension of the seals, are matched in such a way that the seal which consists of an elastic material protrudes slightly above the surface of the base plate.

Subsequently, the work piece is placed upon the seal and vacuum is generated through the channel and the vacuum source junction, wherein the work piece is pressed upon the surface of the base plate with a precise fit and is held in this position. Since a system of grooves, preferably a groove grip, is provided in the invention, it is possible always to produce a seal contour corresponding to the work piece, wherein a plurality of channels which are closed discharges into the area of the entire system of grooves. For vacuum clamping, at least one channel is selected which lies inside the seal contour or periphery and the channel is opened so that a vacuum for clamping the work piece is built up in this way.

Because of the preferably uniform distribution of the channels to be opened to discharge into the grooves, it is always possible, even with oversized work piece contours, to select one or several channels located within the seal contour. The other channels remain closed, so that no leakage losses arise. Vacuum-type clamping is quasi and "invisible" clamping, meaning the work piece is not retained by means of clamping jaws, stops etc., which interfere with the course of the machining or treatment process.

In accordance with a refinement of the invention, the vacuum source junction is disposed at one of the end sides of the base plate. In a particularly preferred manner, the system of grooves comprises grooves which extend net-like and transit into one another at their crossing points. In particular, a system of grooves is made available, where grooves running in X- and Y-direction are provided which form a right angle between one another (Cartesian coordinates).

According to another refinement of the invention, mechanical arrangements, in particular threaded bores and/or close-tolerance bores are disposed between the grooves. These mechanical attachment arrangements can be used in addition to vacuum clamping. It is therefore possible to thread screws or bolts into the threaded bores in order to attach work piece clamping devices, stop pieces or the like on the surface of the base plate. In addition, close-tolerance bores can be provided into which fitted sleeves can be placed which protrude beyond the surface of the base plate, with a partial portion of their length, so that they can be inserted into corresponding close tolerance bores of stop pieces, clamping elements or the like.

Each channel comprises preferably a threaded segment, into which an unscrewable stud screw can be threaded by a closing or sealing screw. In order to open the channel, it is merely necessary to unscrew the stud screw. For closing the channel, it is necessary only to screw the stud screw again into the threaded segment of the channel.

The channels discharge preferably into transverse channels, extending obliquely to the channels. It is possible for several channels to discharge into a single oblique channel. The oblique channels lead to the vacuum source junction. In this way, the base plate is penetrated by a system of channels (in particular a system of bores) wherein it is always possible in cooperation with the channels discharging into the system of grooves to create the suction channels at the desired point for producing the vacuum.

A sealing strip is, as explained, preferably used as sealing material, which is cut to length from a storage roll and then is placed into the selected grooves to match the contour to be filled.

BRIEF DESCRIPTION OF THE DRAWINGS

The invention will be better understood by the Detailed Description of the Preferred Embodiment, with reference to the drawings of which:

FIG. 1 is a plan view upon a segment of a base plate of a work piece clamping device;

FIG. 2 is a cross sectional view of the apparatus of FIG. 1, along line II—II of FIG. 1.

DETAILED DESCRIPTION OF THE PREFERRED EMBODIMENT

Figure 3:
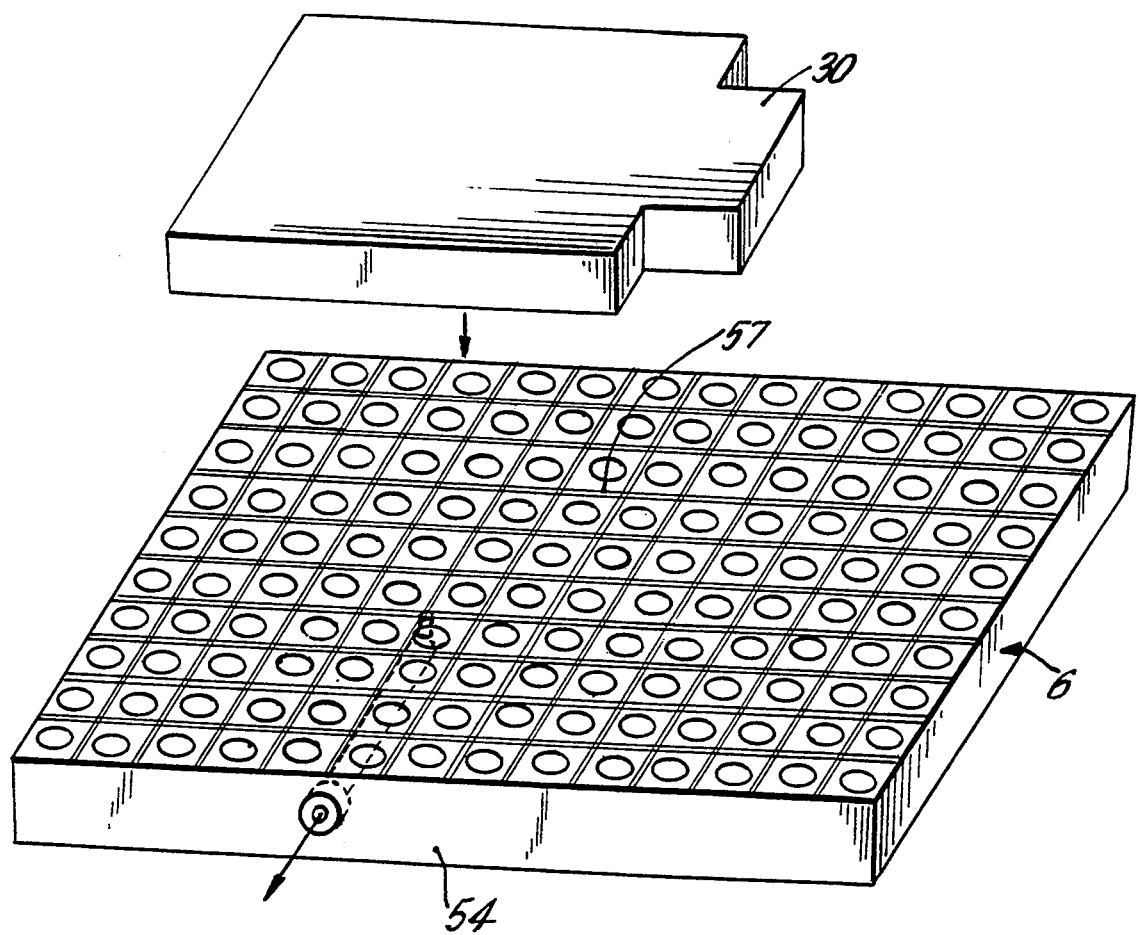
FIG. 3 a perspective view of the work piece clamping device.

Referring now to the drawings, wherein like numerals reflect like elements throughout the various views, FIG. 1 discloses a work piece clamping device having a base plate 6, provided with a plurality of close tolerance bores 7. The close tolerance bores 7 are disposed to be equally spaced from one another in rows in the X-Y-direction, so that they form an area grid. These close tolerance bores 7 are provided for reasons of clarity in X-direction with the designation 1, 2, etc. and in Y-direction with the letters A, B, C, etc. These coordinate designations are not necessary in actual practice.

The surface 8 of the base plate 6 is penetrated by a system of groves 9, wherein grooves 10 extend in X- as well as in Y-direction and run respectively in the middle between the correspondingly formed close tolerance bore rows. The system of grooves 9 is thus configured to be net-like.

The layout of the close tolerance bores 7 is seen especially clearly from the cross-sectional view in FIG. 2. It can be seen that each close tolerance bore 7 has a region 11, adjacent to the surface 8 at the base plate 6, which is configured as a cylindrical segment 12. A threaded segment 14 of the bore 7, located in a region facing away from the surface 8, follows coaxially upon this cylindrical segment 12. The disposition is selected in such a way that the internal diameter of the cylindrical segment 12 is larger than the internal diameter of the threaded segment 14, thereby forming an annular step 15 in the close tolerance bore 7.

It is possible, according to FIG. 2 to slip close tolerance of fitted pieces 16, into one or several of selected close tolerance bores 7. Each fitted piece 16 is configured as a fitted sleeve 17, whose external diameter is matched to the internal diameter dimension of the cylindrical segment 12. The fitted sleeve 17 is slipped to such a depth into the close tolerance bore 7 that the end face of the fitted sleeve 17 comes to lie at the annular step 15. The length of the fitted sleeve 17 is selected in such a way that it projects by the length of a segment beyond the surface 18 of the base plate 6. The internal diameter of the fitted sleeve 17 is larger than the internal diameter of the threaded segment 14. It is now possible to slip an element provided with matching close tolerance bores, for instance a stop strip, a clamping device or the like over the segment of the fitted sleeve 17 projecting by a partial region beyond the surface 8 of the base plate 6, wherein several bores are provided for this purpose and many fitted sleeves 17 can be inserted into the base plate 6. Subsequently, a thorough clamping of the stop strip or the like can occur by means of a threaded screw which penetrates the fitted sleeve 17 and is threaded into the threaded segment 14.

It is seen from FIG. 1 that the base plate 6, comprises a system of grooves 9, wherein a plurality of channels 52 discharge into the grooves 10 of the system of grooves 9. The channels 52 are distributed uniformly across the area of the base plate. For reasons of clarity only channel 52 is shown in FIG. 1. The channels 52 lead into transverse channels 53 which extend to one of the end faces 54 of the base plate 6. In this way, the base plate 6 is quasi=penetrated by a system of channels (FIG. 1 shows only a small part of the system of channels). The channels 52 discharge into the base of the groove of the system of grooves 9. They are provided with a threaded segment 55 (FIG. 2), into which a stud screw (not shown) can be respectively threaded. In the threaded-in state the stud screw lies within the system of grooves 9, meaning it does not project beyond the surface 8 of the base plate 6. The system of channels is sealed by these stud screws, meaning no air can penetrate. The transverse channel 53 ends in a vacuum junction 56 in the end face 54 of the base plate 6. Thus an appropriate vacuum source (not shown), can be attached at this point.

If a work piece 30 is to be clamped according to FIG. 3 upon the base plate 6, a seal 57 corresponding approximately to the contour of the work piece 30 is inserted into the net-like configured system of grooves 9. It is shown in FIG. 2 that the strip-like seal 57 projects slightly beyond the surface 8 of the base plate 6 in its inserted state. The seal 57 is preferably cut to the length off a storage roll; herein we are dealing with consumption material, wherein a seal may be reused several times.

The seal contour is selected to be smaller than the periphery of the work piece 30 so that the bottom side of the work piece 30 rests upon the seal 57. For this purpose, appropriate grooves 10 are selected from the system of grooves 9, so that the desired contour is obtained. In the inserted state, the seal 57 constitutes a periphery closed in itself. A channel 52, located within the contour enclosed by the seal 57, is opened by unscrewing the appropriate stud screw 60 from the threaded segment 55 (which is indicated by means of the arrow 61 in FIG. 2) and the work piece 30 is placed upon the surface 9 of the base plate 6. If the vacuum source connected to the vacuum source junction is turned on, a vacuum is generated below the work piece 30, whereby the work piece 30 is fixed on the base plate 6.

In addition to the vacuum-type clamping described above, there exists the possibility of using the mechanical attachment arrangement close tolerance bores 7 to attach additionally mechanical devices on the surface 8 of the base plate 6. These are naturally not required for increasing the clamping strength of the vacuum-type clamping, because extraordinarily high clamping forces can be applied by vacuum clamping. Situations occur however frequently in actual practice, where the use of the vacuum as well as mechanical clamping systems is simultaneously possible and desirable. These two clamping systems should not interfere with each other, wherein each can be used alone by itself or, as explained, simultaneously with the other.

The extension of the grooves 10 of the system of grooves 9 in a net-like manner and transit into one another at their crossing points assures that, with the seal 57 in place, the grooves 10 extending transversely to this seal 57 are closed off, so that a vacuum can be formed essentially free of leaks beneath the work piece 30.

While the preferred embodiment of the invention has been disclosed in detail, modification and adaptations may be made thereto, without departing from the spirit and scope of the invention, as delineated in the following claims:

What is claimed is:

1. A workpiece clamping device, comprising:
   a base plate for vacuum-type clamping of work pieces, said base plate having an upper surface and a system of grooves formed in the upper surface, extending in a net-like manner and merging into each other at crossing points thereof;
   a seal placed into selected grooves of the system of grooves;
   channels formed in the base plate, opening into grooves of the system of grooves, and each having a threaded segment;
   sealing screws threadable into the channels;
   at least one vacuum source junction disposed at an end face of the base plate, the channels communicating with the at least one vacuum source junction; and
   means for enabling placing mechanical attachment arrangements on the upper surface of the base plate, the enabling means including at least one of threaded bores and close tolerances bores formed in the base plate between the grooves of the system of grooves.

2. The workpiece clamping device of claim 1, further comprising a plurality of transverse channels extending laterally with respect to the channels, which open into the grooves of the system of grooves, for communicating the channels with the vacuum source junction.

3. The workpiece clamping device of claim 1, wherein the seal comprises a sealing strip having a desired length.

4. A workpiece clamping device, comprising:
a base plate for vacuum-type clamping of work pieces, said base plate having an upper surface and a system of grooves formed in the upper surface, extending in a net-like manner and merging into each other at crossing points thereof;
a seal placed into selected grooves of the system of grooves;
channels formed in the base plate, opening into the grooves of the system of grooves, and each having a threaded segment;
sealing screws threadable into the channels; and
at least one vacuum source junction, the channels communicating with the at least one vacuum source junction.

5. A workpiece clamping device, comprising:
a base plate for vacuum-type clamping of work pieces, said base plate having an upper surface and a system of grooves formed in the upper surface, extending in a net-like manner and merging into each other at crossing points thereof;
a seal placed into selected grooves of the system of grooves;
channels formed in the base plate, opening into the grooves of the system of grooves;
at least one vacuum source junction, the channels communicating with the at least one vacuum source junction; and
means for enabling placing mechanical attachment arrangements on the upper surface of the base plate, the enabling means including at least one of threaded bores and close tolerances bores formed in the base plate between the grooves of the system of grooves.

* * * * *